(12) United States Patent
Monroe et al.

(10) Patent No.: US 7,756,782 B2
(45) Date of Patent: Jul. 13, 2010

(54) SYSTEM AND METHOD FOR IMPROVED ELECTRONIC TRADING

(75) Inventors: Fred Monroe, Silver Spring, MD (US); Harris C. Brumfield, Chicago, IL (US)

(73) Assignee: Trading Technologies International, Inc., Chicago, IL (US)

(*) Notice: Subject to any disclaimer, the term of this patent is extended or adjusted under 35 U.S.C. 154(b) by 0 days.

(21) Appl. No.: 10/628,631

(22) Filed: Jul. 28, 2003

(65) Prior Publication Data

US 2005/0027635 A1 Feb. 3, 2005

(51) Int. Cl.
G06Q 40/00 (2006.01)

(52) U.S. Cl. .......................................................... 705/39

(58) Field of Classification Search ............. 705/35–40, 705/1, 25
See application file for complete search history.

(56) References Cited

U.S. PATENT DOCUMENTS

| | | | | |
|---|---|---|---|---|
| 5,101,353 A * | 3/1992 | Lupien et al. ................. | 705/37 |
| 5,297,031 A | 3/1994 | Gutterman et al. | |
| 5,963,923 A * | 10/1999 | Garber ......................... | 705/37 |
| 6,085,176 A | 7/2000 | Woolston | |
| 6,131,087 A | 10/2000 | Luke et al. | |
| 6,519,574 B1 * | 2/2003 | Wilton et al. ................. | 705/35 |
| 6,912,511 B1 | 6/2005 | Eliezer et al. | |
| 7,155,410 B1 | 12/2006 | Woodmansey et al. | |
| 7,177,833 B1 * | 2/2007 | Marynowski et al. ......... | 705/38 |
| 7,386,499 B2 | 6/2008 | Kocher | |
| 2001/0042041 A1 | 11/2001 | Moshal et al. | |
| 2001/0049650 A1 | 12/2001 | Moshal et al. | |
| 2002/0013757 A1 * | 1/2002 | Bykowsky et al. ............ | 705/37 |
| 2002/0091617 A1 * | 7/2002 | Keith ........................... | 705/37 |
| 2002/0116205 A1 * | 8/2002 | Ankireddipally et al. ....... | 705/1 |
| 2002/0156716 A1 * | 10/2002 | Adatia ......................... | 705/37 |
| 2002/0178104 A1 * | 11/2002 | Hausman ..................... | 705/37 |
| 2002/0188549 A1 * | 12/2002 | Nordlicht ..................... | 705/37 |
| 2003/0069834 A1 * | 4/2003 | Cutler .......................... | 705/37 |
| 2003/0126068 A1 * | 7/2003 | Hauk et al. .................. | 705/37 |

(Continued)

OTHER PUBLICATIONS

The Free Dictionary by Farlex: http://financial-dictionary.thefreedictionary.com/Intermarket+Trading+System.*

(Continued)

*Primary Examiner*—Olabode Akintola
(74) *Attorney, Agent, or Firm*—McDonnell Boehnen Hulbert & Berghoff LLP (57) ABSTRACT

A system and method is described herein for an exchange to act based on a market event on behalf of a trader. According to one aspect, a first electronic market can send orders to and/or manage orders at a second electronic market based on an internal and/or external market event on behalf of a trader. According to another aspect, an electronic market may manage orders in its own market based on an external market event on behalf of a trader. In particular, a trader, and exchange, or some other party can define an internal or external market event that comprises a condition and an action. Upon receiving internal and/or external information, when the market event condition is satisfied, the electronic market performs the action associated with the condition. An advantage, among many others, of the present embodiments is that it makes internal and external market influences and conditions visible to electronic markets to facilitate trading on behalf of a trader.

18 Claims, 5 Drawing Sheets

U.S. PATENT DOCUMENTS

| | | |
|---|---|---|
| 2004/0153391 A1 | 8/2004 | Burns et al. |
| 2004/0210504 A1 | 10/2004 | Rutman |
| 2004/0210511 A1 | 10/2004 | Waelbroeck et al. |
| 2006/0259400 A1 | 11/2006 | Monroe |
| 2006/0259403 A1 | 11/2006 | Monroe |

OTHER PUBLICATIONS

M. Sivy, "Forecast 2001", Money Magazine, Jan. 2001, p. 64 (7 pages), vol. 30, Issue 1.*

F. Zarb, Transcript of National Press Club Luncheon Speech, Jun. 23, 1999.*

Financial News, "Order Management Systems Drive Growth", Financial Times (Daily), May 11, 2003, Financial Times Information.*

International Search Report for PCT/US04/25543 mailed Apr. 27, 2005.

F. Zarb, Transcript of National Press Club Luncheon Speech, Jun. 23, 2009.

Preliminary Amendment for U.S. Appl. No. 11/416,459 filed Jul. 26, 2006.

Non-Final Office Action for U.S. Appl. No. 11/416,459 mailed Sep. 27, 2007.

Non-Final Office Action Response for U.S. Appl. No. 11/416,459 filed Dec. 27, 2007.

Final Office Action for U.S. Appl. No. 11/416,459 mailed Apr. 2, 2008.

Final Office Action Response for U.S. Appl. No. 11/416,459 filed Jun. 9, 2008.

Advisory Action for U.S. Appl. No. 11/416,459 mailed Jun. 26, 2008.

Response filed with Request for Continued Examination (RCE) for U.S. Appl. No. 11/416,459, Aug. 1, 2008.

Non-Final Office Action for U.S. Appl. No. 11/416,459 mailed Sep. 24, 2008.

Non-Final Office Action Response for U.S. Appl. No. 11/416,459 filed Dec. 18, 2008.

Final Office Action for U.S. Appl. No. 11/416,459 mailed Apr. 15, 2009.

Final Office Action Response for U.S. Appl. No. 11/416,459 filed Jun. 1, 2009.

Advisory Action for U.S. Appl. No. 11/416,459 mailed Jun. 10, 2009.

Non-Final Office Action for U.S. Appl. No. 11/416,459 mailed Jul. 30, 2009.

Non-Final Office Action Response for U.S. Appl. No. 11/416,459 filed Oct. 27, 2009.

Interview Summary for U.S. Appl. No. 11/416,459 mailed Nov. 4, 2009.

Final Office Action for U.S. Appl. No. 11/416,459 mailed Feb. 1, 2010.

\* cited by examiner

SYSTEM AND METHOD FOR IMPROVED ELECTRONIC TRADING

BACKGROUND

At one time, there were only open-outcry exchanges where traders, or more specifically buyers and sellers, would come together to trade in person. Recently, electronic exchanges have followed suit with the central evolutionary difference being the process of automatic and electronic matching of bids and offers.

In particular, subscribing traders are connected to an exchange's electronic trading platform by way of a communication link and through an application program interface to facilitate real-time electronic messaging between themselves and the exchange. The electronic trading platform includes at least one electronic market, which is at the heart of the trading system for a particular market and handles the matching of bids and offers placed by the subscribing traders for that market. The electronic messaging includes market information that is sent from the electronic market to the traders. Once the traders receive market information, it may be displayed to them on their trading screens. Upon viewing the information, traders take certain actions including the actions of sending buy or sell orders to the electronic market, adjusting existing orders, deleting orders, or otherwise managing orders. Traders may also use software tools on their client devices to automate these and additional actions.

Just as with an open-outcry exchange, an electronic exchange can list any number of markets. Often times, traders will trade simultaneously in more than one market and they may trade simultaneously in markets that are listed at more than one exchange. Ordinarily, each market has its own independent electronic market, and therefore, its own separate stream of market information. Therefore, in these instances, the traders will generally receive more than one stream of market information such that each stream of market information attempts to characterize a given market. In addition to receiving market information from exchanges, traders might subscribe to news feeds such as Bloomberg and Reuters, they might subscribe to real-time quotation vendors that provide information to traders for decision support, and they might subscribe to other news and information sources, all of which are collectively referred to herein as news.

Figure 1:
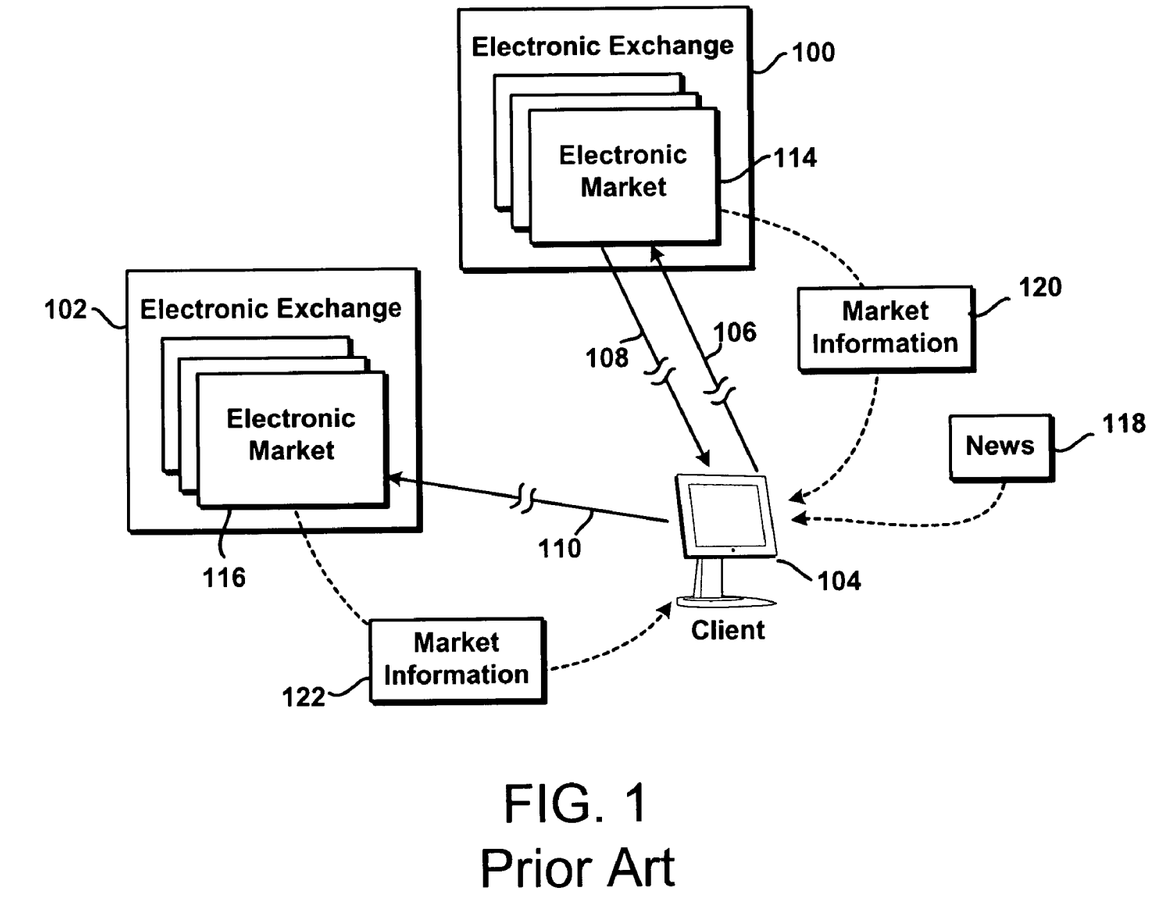
FIG. 1 is a block diagram that illustrates how, over an existing electronic trading system, a trader might use market information and news to assist him in implementing his trading strategy.

FIG. 1 is provided to illustrate one example of trading in two conventional electronic markets 114, 116. More specifically, FIG. 1 is intended to illustrate some of the kinds of information that a trader may refer to while they trade. To assist in assimilating all of this information, traders often employ automated software tools. However, even the very best software tools at their trading terminals are limited in performance by the networks they communicate over.

In general, FIG. 1 shows two electronic exchanges 100, 102 and connected to the two exchanges is trader's client device 104. Exchanges 100, 102 are electronic exchanges that are hosted at locations that can be geographically near or far from each other. For example, both electronic exchanges 100, 102 could be located in the same city or they could be located in cities separated by continents. In fact, an advantage of an electronic exchange over a conventional open-outcry exchange is that either of the electronic exchanges 100, 102 can exist practically anywhere in the world so long as a high-speed network connection is available to attract subscribing customers. Also, for sake of illustration, the two electronic markets are hosted at two separate electronic exchanges 100, 102, although it is possible for the two electronic markets to be hosted at one electronic exchange. Client device 104 is a trading terminal for use by a trader and it too can be located at any location across the world so long as an electronic connection to electronic exchanges 100, 102 is provided to receive market information 120, 122, respectively. Also, the trader at client device 104 might subscribe to a news service 118. Other subscribing client devices and the various components of the communication link are not shown in FIG. 1 for sake of clarity.

Assume that a buy order or a sell order is sent to a market listed at electronic exchange 100 by path 106. Upon receipt of the order, electronic market 114 designed for that particular market determines if a match exists. More specifically, the electronic market 114 checks the conditions associated with the order, for example order price and quantity, and it compares them with orders resting in its electronic order book. If a match does not exist, the electronic market 114 prioritizes the order with other orders (if any) in the electronic order book of the same price. (Some electronic markets prioritize orders first in the electronic order book and then attempt to match them). Priority may be dependent on the individual specification of the market. Generally, a match exists when the order conditions are satisfied in the market. If a match exists, then a fill confirmation message is commonly sent to client device 104 by path 108, because it was involved in the trade. In addition, all subscribing traders, including those involved in the trade, get some or all of the updated electronic order book information by way of new market information 120.

Upon receiving the fill confirmation message by path 108, the trading software at client device 104 typically updates the trading screen to indicate that the order has been filled. The trader or trading software residing at client device 104 can react by sending an offsetting order to electronic market 116 by path 110, thereby offsetting the position caused by the filling of the first order.

Practically speaking, there are an unlimited number of matching algorithms that can be used by the electronic market to match bids and offers. Mostly, these matching algorithms share common characteristics with well-known matching algorithms sometimes referred to as the price/time priority algorithm and the price/pro-rata algorithm. The price/time priority is that the highest bid and the lowest offer has priority over orders in the same market and the first order at a price has priority over all other orders at the same price. The price/pro-rata priority is that the highest bid and the lowest offer has priority over orders in the same market and all (or most) orders at a price, at a particular point in time, have the same priority. Most, if not all, matching algorithms are focused around timing. In other words, if a trader's order is not at the electronic market, it will not be matched.

Therefore, regardless of the type of matching algorithm used by the electronic market, for the offsetting order to be filled it is often imperative that the offsetting order arrives at the market as soon as possible. That way, if the market price is at the offsetting order price or if the market moves to the offsetting order price, the likelihood of the offsetting order being filled is high. Otherwise, the offsetting order might sit in the market, and as a result, the trader can lose a significant amount of money, especially if the market price moves away from the offsetting order price. For example, according to a certain type of trading referred to as spread trading, if the offsetting order cannot be filled, it results in being "legged up." A central reason for being "legged up" arises from being late to the market and missing out on an opportunity.

Referring to FIG. 1, take for instance the total time delay incurred from receiving the fill confirmation by path 108, updating the trading screen at client device 104, reacting to the fill, and sending an offsetting order to exchange 102 by path 110. This time delay can result in the trader's offsetting order being late to the market and missing out on an opportunity, therefore being "legged up." There could also be unknown time delays due to network downtime or slow connection speeds between the exchanges 100 and 102 and client device 104. Moreover, traders located geographically far from the electronic exchange may be at an unfair disadvantage from those traders who are located near the electronic exchange because of their possibly longer network transmission times. A similar total time delay may also be found even if the trader has chosen to offset his orders in different markets listed at the same exchange because the same actions taken will most likely need to occur. In addition, comparable time delays may result when managing existing orders.

While electronic exchanges and markets are insulated at the host, the traders at their client devices assimilate information from multiple markets such as from market information 120,122 and take actions based on this information. Also, many traders at their client devices or on separate output devices receive news 118 on which they base their trading actions. In many instances, like the offsetting order example given above with respect to FIG. 1, spotting an opportunity in the market and capitalizing on it before the market moves or before a competing trader does can separate those traders who are successful from those traders who are not. An important component in capitalizing on an opportunity involves quickly assimilating information and then quickly acting on that information to get your order to the exchange for matching.

BRIEF DESCRIPTION OF THE DRAWINGS

Many aspects of the present embodiments can be better understood with reference to the following drawings. The components in the drawings are not necessarily to scale, emphasis instead being placed upon illustrating example embodiments of the present invention.

DETAILED DESCRIPTION

I. Overview

Like an open outcry exchange, a conventional electronic exchange has continued to place the burden on the traders to analyze market information in real-time and react accordingly to capitalize on an opportunity. While there is an enormous amount of information available to the trader, it is generally left up to the trader (or software at the client device) to sort through all of this information and quickly act when using a conventional electronic exchange.

The present embodiments have transitioned some of this burden to the exchange by opening communication between the electronic markets so that the electronic market on behalf of the trader can automatically take actions. In other words, the present embodiments preferably link the electronic markets so that market information may be shared to create a more unified trading environment amongst markets and market participants. Moreover, an electronic market preferably has access to news. Using some or all of this information, an electronic market can efficiently determine when a market event condition is satisfied and automatically act on behalf of the trader.

Other systems, methods, features, and advantages of the present embodiments will be or become apparent to one with skill in the art upon examination of the following drawings and description. It is intended that all such additional systems, methods, features, and advantages be within the scope of the present invention, and be protected by the accompanying claims.

II. Preferred System Architecture

Figure 2:
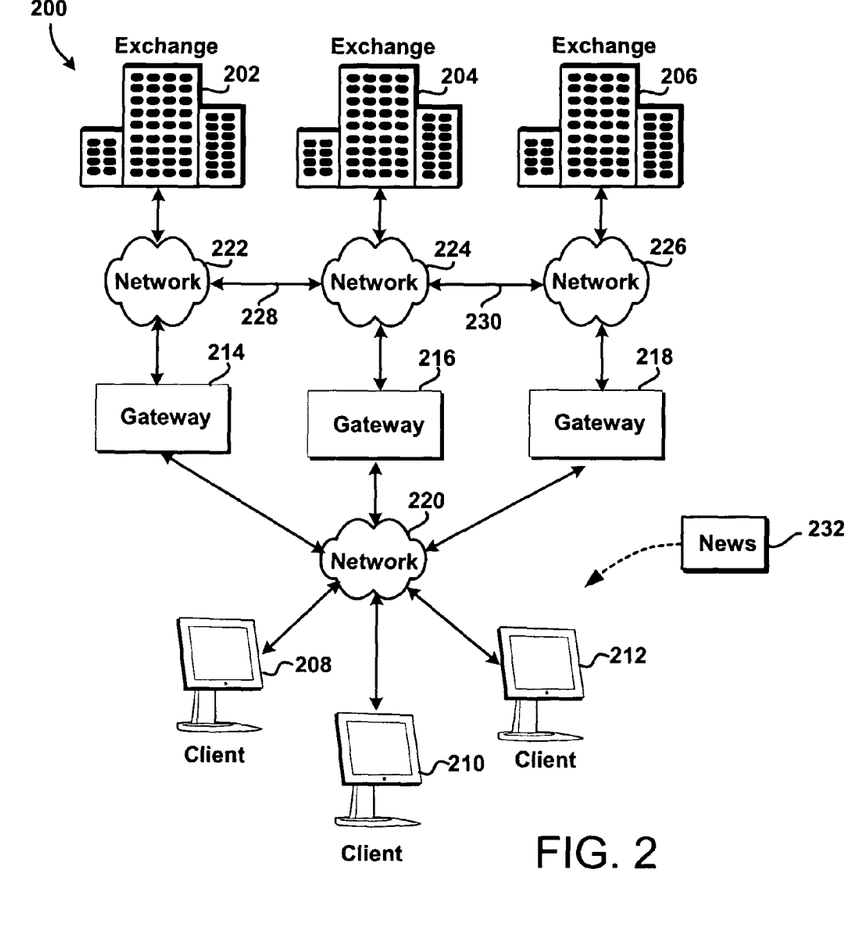
FIG. 2 is a block diagram of an example electronic trading system in accordance with the present embodiments that includes connection of multiple electronic exchanges and multiple client devices.

FIG. 2 is a block diagram that illustrates in more detail an example electronic trading system 200. The electronic trading system 200 includes one or more electronic exchanges 202, 204, 206 and one or more client devices 208, 210, 212. Client devices 208, 210, and 212 might also subscribe to a news service 232. Intermediate devices such as gateways 214, 216, 218, routers (not shown), and other such types of network devices may be used to connect network 220 to networks 222, 224, 226 so that client devices 208, 210, 212 and exchanges 202, 204, 206 can communicate market information. In addition, networks 222, 224, 226 are preferably connected together via high-speed channels to provide a path 228, 230 for sending orders from one exchange to another.

It should be understood that the present embodiments are not limited to any particular system configuration. For example, networks 222, 224, 226 could represent the same network, network 220 could represent the same network as networks 222, 224, 226, or client devices 208, 210, 212 could connect directly to gateways 214, 216, 218. In addition, the present embodiments may be implemented with systems that have only one electronic exchange that lists one or markets.

A. Electronic Exchange

Electronic exchanges 202, 204, 206 represent exchanges that participate in electronic trading. The London International Financial Futures and Options Exchange (LIFFE), the Chicago Board of Trade (CBOT), the New York Stock Exchange (NYSE), the Chicago Mercantile Exchange (CME), the Exchange Electronic Trading ("Xetra," a German stock exchange), and the European Exchange ("Eurex") are examples of exchanges that participate in electronic trading. Electronic exchanges 202, 204, 206 might also refer to other facilities, which include basic to complex systems that automatically match incoming orders. These example exchanges and other exchanges are well known in the art. Communication protocols required for connectivity to one of these exchanges are also well known in the art.

Electronic exchanges 202, 204, 206 allow traders to log onto an electronic market to trade tradable objects. As used herein, the term "tradable objects," refers simply to anything that can be traded with a quantity and/or price. It includes, but is not limited to, all types of tradable objects such as financial products, which can include, for example, stocks, options, bonds, futures, currency, and warrants, as well as funds, derivatives and collections of the foregoing, and all types of commodities, such as grains, energy, and metals. The tradable object may be "real," such as products that are listed by an exchange for trading, or "synthetic," such as a combination of real products that is created by the user. A tradable object could actually be a combination of other tradable object, such as a class of tradable objects.

For purposes of explanation, it should be understood that a group of tradable objects might be considered as one market. Information outside of the realm of the single market may be considered external to that market and information inside the realm of the single market may be considered internal to that market. For instance, tradable objects that differ only by expiration date or strike price using the same electronic exchange may be considered a single market for purposes of describing the present embodiments.

An electronic market can implement numerous types of order execution algorithms; sometimes the type of algorithm depends on the tradable object being traded. The present embodiments can work with any particular order execution algorithm. As previously mentioned, some example order execution algorithms include price/time priority (also referred to as first-in-first-out or FIFO) and pro rata-style algorithms. The FIFO algorithm, used for some markets listed with Eurex for example, attempts to give priority to the first person to place an order. The pro rata algorithm, used for some markets listed with LIFFE for example, splits all (or most) orders for the same price at a particular point in time. It should be understood that the present invention is not limited to any particular type of order execution algorithm. Benefit from the use of the present embodiments may be found apart from the order execution or matching algorithm used.

It should also be known that an electronic market might include other software and/or hardware components to perform other tasks beyond matching. These software and/or hardware components and those components of the present embodiments may be local or remote to the physical location of an electronic exchange. In other words, the components may be operated at the electronic exchange or at locations outside of the electronic exchange such as at points of access. Points of access may include gateways or other high performance computing devices that are nearby the electronic exchange and have communication access to other points of access near other electronic exchanges. Traders can link to points of access through one or more networks.

Regardless of the type of order execution algorithm used, each exchange 202, 204, 206 preferably provides similar types of information to subscribing client devices 208, 210, 212. Market information may include data that represents just the inside market. The inside market is the lowest sell price (best ask) and the highest buy price (best bid) at a particular point in time. Market information may also include market depth. Market depth refers to quantities available at the inside market and can also refer to quantities available at other prices away from the inside market. The quantity available at a given price level is usually provided by the host exchange in aggregate sums. In other words, an electronic exchange usually provides the total buy quantity and the total sell quantity available in the market at a particular price level in its data feed. The extent of the market depth available to a trader usually depends on the exchange. For instance, some exchanges provide market depth for all (or most) price levels, while some provide only quantities associated with the inside market, and others may provide no market depth at all. Additionally, exchanges 202, 204, 206 can offer other types of market information such as the last traded price (LTP), the last traded quantity (LTQ), and order fill information.

According to the present embodiments, one or more of electronic exchanges 202, 204, 206 is preferably modified to send orders to and/or manage orders at other electronic markets when a market event condition is satisfied. The electronic markets may be listed at the same exchange or they may be listed at different exchanges. According to this embodiment, the market event condition may be based on internal events, external events, or both internal and external events. An external event relates to information outside of the realm of a single market and may be considered external to that market, whereas an internal event relates to information inside the realm of the single market and may be considered internal to that market. Sending orders preferably includes sending an electronic message with order details required by the electronic market. Managing orders preferably includes making price changes, quantity changes, or otherwise modifying an existing order including actual deletion of the order.

Once the electronic market sends the order to another electronic market, the trader preferably maintains control of the order just as if the trader, himself, entered the order from his trading terminal. For instance, if the electronic market accepts packets, where a packets consists of binary digits representing both data and a header containing an identification number, source and destination addresses, and sometimes error-control data, then the electronic market can use the source address of the trader (instead of the sending electronic market address) so that the receiving electronic market recognizes that the order refers to a trader and not the sending electronic market. If so desired and the receiving electronic market supports it, the sending electronic market could also put an identifier in the packet to let the receiving electronic market know that the packet came from the electronic market on behalf of the trader.

If the electronic market sends an order to another market listed at the same electronic exchange, then the order does not necessarily have to travel outside of the electronic exchange (unless the present embodiments or a portion thereof are implemented at a point of access, for example). Rather, the electronic market can simply route the order to the appropriate electronic market. If the electronic market sends an order to a market listed at another exchange, then the order can be transmitted directly from the sending exchange to the receiving exchange via paths 228 or 230. Of course, alternative paths between exchanges 202, 204, 206 may be provided.

If the electronic market manages an order, then preferably it does so as if it were the trader performing the adjustment or deletion. For example, the electronic market may send electronic messages to change the order such as increase/decrease order quantity, move the order to a different price, cancel the order, and so forth. The message format used by the electronic market preferably conforms to the same electronic market's protocol that a trader would use to send similar messages.

According to another aspect of the present embodiments, one or more of electronic exchanges 202, 204, 206 is preferably modified to automatically manage orders in its own market when an external market event condition is satisfied. As previously stated, managing orders preferably includes making price changes, quantity changes, or otherwise modifying an existing order including actual deletion of the order For example, a trader might have one or more orders resting at the electronic market. According to this aspect, the electronic market may automatically manage those resting orders on behalf of the trader and based in part on external market events.

B. Gateway

Gateways 214, 216, 218 are devices such as a mainframe, super minicomputer, minicomputer, workstation, or microcomputer that connect network 220 to networks 222, 224, 226 so that market information may be successfully passed between client devices 208, 210, 212 and exchanges 202, 204, 206. Preferably, gateways 214, 216, 218 receive market information from exchanges 202, 204, 206 and convert it to a form compatible with the protocols used by client devices 208, 210, 212 using conversion techniques known in the art. Also, as known by those skilled in the art, gateways 214, 216, 218 may have one or more servers to support the data feeds, such as a price server for processing price information, an order server for processing order information, and a fill server for processing fill information. A trader at one of client devices 208, 210, 212 can preferably subscribe to price information, order information, and fill information for a particular market hosted at exchanges 202, 204, 206. Preferably, gateways 214, 216, 218 also receive transaction information, such as orders, order changes, queries, etc. from client devices 208, 210, 212 and forward that information to corresponding exchanges 202, 204, 206.

C. Client Device

Client devices 208, 210, 212 are devices that provide an interface for traders to trade at one or more markets listed with one, some, or all of exchanges 202, 204, 206. Some examples of client devices include a personal computer, laptop computer, hand-held computer, and so forth. Client devices 208, 210, 212, according to the preferred embodiments, include at least a processor and memory. The processor and memory, which are both well-known computer components, are not shown in the Figure for sake of clarity. Preferably, the processor has enough processing power to handle and process the various types of market information.

Memory may include computer readable medium. The term computer readable medium, as used herein, refers to any medium that participates in providing instructions to processor for execution. Such a medium may take many forms, including but not limited to, non-volatile media, volatile media, and transmission media. Non-volatile media includes, for example, optical or magnetic disks, such as storage device. Volatile media includes dynamic memory, such as main memory or RAM (random access memory). Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, and any other memory chip or cartridge, or any other medium from which a computer can read.

Referring to FIG. 2, client devices 208, 210, 212 receive market information from any of electronic exchanges 202, 204, 206. Preferably, market information is displayed to the trader(s) on a visual output device or display device. A trader may also receive news 232 to aid him in analyzing information received from the exchange. Upon viewing the market information or a portion thereof, a trader may wish to send orders to an exchange, cancel orders in a market, change orders in a market, query an exchange, and so on. To do so, the trader may input various commands or signals into the client device 204, for example, by using one or more conventional means for inputting information such as typing into a keyboard, inputting commands through a mouse, or inputting commands or signals through some other input device.

Upon receiving one or more commands or signals, client devices 208, 210, 212 preferably generate transaction information. For instance, a trader may press a key or button to initiate an order to buy a tradable object. Then, transaction information would include an order to buy a particular quantity of the tradable object at a particular price. There are many different types of messages and/or order types that can be submitted to an electronic exchange, all of which may be considered various types of transaction information. Once generated, transaction information is sent from client device 208 to host exchange 202 over network(s) 220, 222, 224, 226.

III. Example Process

Figure 3:
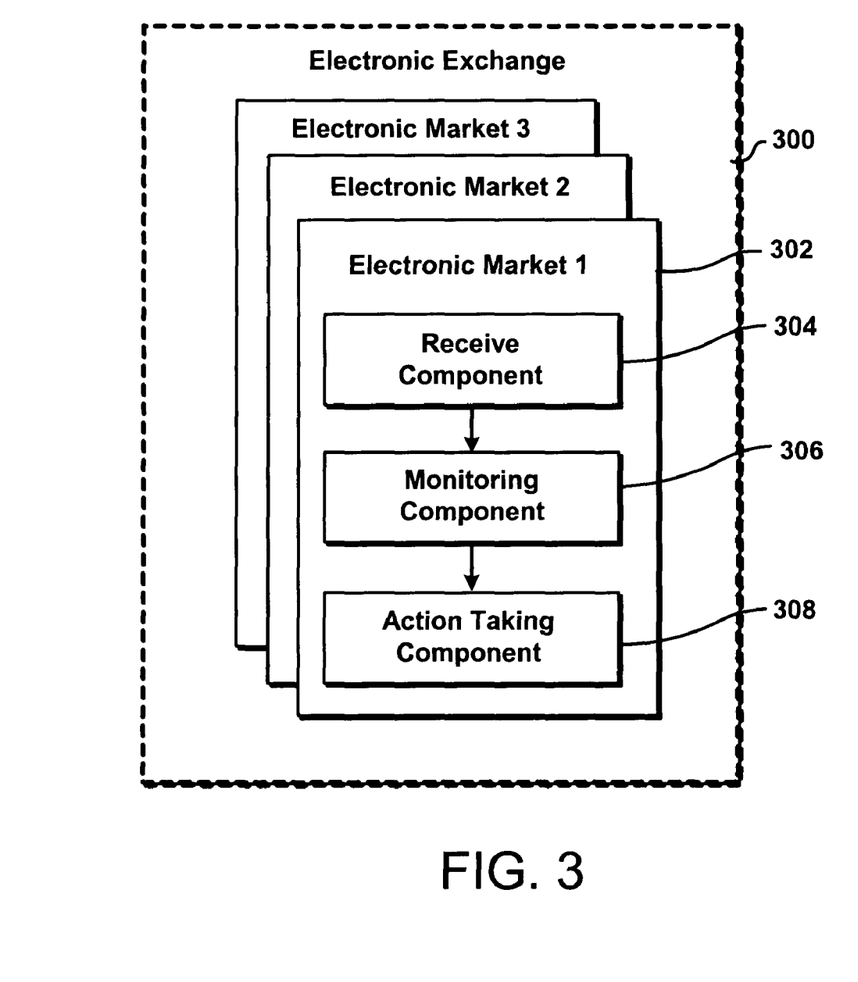
FIG. 3 is a block diagram that illustrates an electronic exchange, similar to one of the electronic exchanges illustrated in FIG. 2, that has multiple electronic markets, and further shows various example software and/or hardware components that may be used by the electronic market to implement the present embodiments.

FIG. 3 shows a block diagram that illustrates at least one electronic market 302 with various components 304, 306, 308 for carrying out the present embodiments. Electronic market 302 is listed at electronic exchange 300. Electronic market 302 includes a receive component 304, a monitoring component 306, and an action taking component 308. Receive component 304, monitoring component 306, and action taking component 308 may include software and/or hardware elements to perform their functions. Electronic exchange 300 and electronic market 302 may include more or fewer components that are not shown in FIG. 4. Also, receive component 304, monitoring component 306, and action taking component 308 may be combined with other components. For instance, some or all of the components 304, 306, 308 may be included with a matching engine component (not shown) of a particular market.

Figure 4:
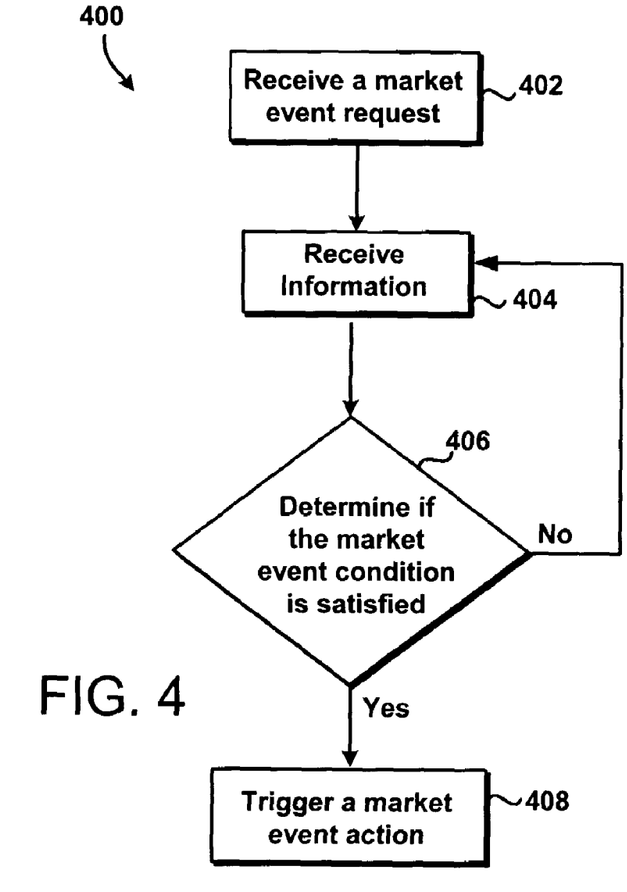
FIG. 4 is a flowchart that illustrates an example process that an electronic market, similar to the electronic market shown in FIG. 3, might use to perform an action on behalf of a trader.

The various components 304, 306, 308 shown in FIG. 3 are explained along with the flowchart 400 set forth in FIG. 4. The flowchart 400 of FIG. 4 shows the functionality and operation of a possible implementation of the present embodiments. In this regard, each block may represent a module, segment, or portion of code, which includes one or more executable instructions for implementing specific logical functions or steps in the process. Alternate implementations are included within the scope of the preferred embodiment of the present invention in which functions may be executed out of order from that shown or discussed, including substantially concurrently or in reverse order, depending on the functionality involved, as would be understood by those reasonable skilled in the art of the present invention.

At block 402, a market event request is received at receive component 304. A market event request is a signal to the electronic market that provides a particular event or condition that has a specific action associated with it. According to the present embodiments, a trader may define and send the market event request electronically to the exchange, or alternatively, another party such as an exchange may define and use the market event request.

A. Defining a Market Event

A market event preferably includes a condition and an action associated with the condition. The market event preferably includes enough detail to give instruction to the electronic market on how to act when the stated condition is satisfied. In addition, it is preferred that the market event instructs the electronic market on which internal and/or external information should be monitored to determine if the condition is satisfied. It should be known that for ease of description, this application refers to the electronic market performing an act when a condition is satisfied, however, the present embodiments also encompass other types of conditions/acts. For instance, the electronic market may be instructed to act when a condition is not satisfied, it may be instructed not to act when a condition is satisfied, or it may be instructed not to act when a condition is not satisfied. All of these conditions/acts are within the scope of the present embodiments.

The market event request message can contain one or more blocks of text (binary, ASCII, or otherwise) for instructing the electronic market on how to act on the trader's behalf. The message might also include beginning and ending characters, control characters, a software-generated header (destination address, type of message, and other such information), error-checking or synchronizing information, or other units of information that may be useful to the electronic market. It should be understood that the present embodiments are not limited to the format of the market event request message.

To illustrate generally how a market event may be defined, assume that a trader is interested in trading market "1" and market "2." Market "1" and market "2" may be listed at the same exchange or at a different exchange. Table 1 is provided below to give some broad examples according to this generalized assumption. Of course, the table does not provide an exhaustive list of market events, but is meant only to illustrate some general examples. In addition, it should be understood that the present embodiments might be used when trading only one market. More details regarding the types of orders, the price and quantity of the orders, or how the order should be changed or when the order should be deleted may also be included in the condition and action definitions.

is based on this premise might be: if order to sell "50" fills at a price of "100" in market "1," then send an order to buy "50" at a price of "85" in market "2." Of course, more or less detail may be provided in the market event so that the electronic market can accurately and efficiently perform the action. The market event may also include constant expressions or variable expressions that may have different outcomes depending on factors in other markets, news, or other outside market influences. This includes the use of basic to more complex equations that depend on multiple variables or sources of information (e.g., internal/external).

For ease of searching the market event definitions, a previously constructed table of values, ranges of values, conditions, or equations referred to herein as a lookup table may be searched by an electronic market for the desired market event. Table 2 below shows an example of a lookup table that may be used to define one or more market events. A lookup table may include rows and columns of data. A lookup function at the electronic market may examine the table either horizontally or vertically and then retrieve the data that corresponds to the argument specified as part of the lookup function. In view of that, the electronic market preferably has either direct or

TABLE 1

Example Market Events

| Condition | Action taken by an exchange |
|---|---|
| 1) If an order fills in market "1" then: | Send an order to market "2" |
| 2) If the last traded price of market "1" exceeds a set price then: | Send an order to market "2" |
| 3) If the last traded price of market "1" drops below a set price then: | Send an order to market "2" |
| 4) If a set portion of the order in market "1" fills then: | Send an order to market "2" |
| 5) If the quantity available at a given price in market "1" drops below a set level then: | Send an order to market "2" |
| 6) If the quantity available at a given price in market "1" exceeds a set level then: | Send an order to market "2" |
| 7) If the unemployment number exceeds a certain threshold then: | Send an order to market "1" and/or market "2" |
| 8) If the unemployment number drops below a certain threshold then: | Send an order to market "1" and/or market "2" |
| 9) If the unemployment number exceeds a certain threshold and if the last traded price of market "1" exceeds a set price: | Send an order to market "1" and/or market "2" |
| 10) If the inside market moves a certain number of price units away from the order in market "1" then: | Adjust the order in market "2" |
| 11) If the inside market moves a certain number of price units away from the order in market "2" then: | Adjust the order in market "1" |
| 12) If the interest rate has been cut by the Federal Chairperson then: | Adjust order market "1" and/or in market "2" |
| 13) If the unemployment number exceeds a certain threshold and if the last traded price of market "1" exceeds a set price: | Send an order to market "1" and/or market "2" |
| 14) If the unemployment number exceeds a certain threshold and if the last traded price of market "1" exceeds a set price: | Adjust order in market "1" and/or in market "2" |

The market events as shown in Table 1 above are broken up into a condition and an action. The condition is an occurrence that may or may not be satisfied so that an action may be triggered. As mentioned previously, the market event definitions may include as many details as necessary for the electronic market to perform the action when the stated condition occurs. For example, looking to the first general example provided in the table above: 1) If an order fills in market "1" then send as order to market "2." An actual market event that indirect access to the lookup table. The lookup table may have more or fewer rows and columns than shown in Table 2.

TABLE 2

| Price Range in Market 1 | Prices in Market 2 | Quantity | Order Type |
|---|---|---|---|
| Price Range 1 | Price 1 | Qty 1 | Buy |
| Price Range 2 | Price 2 | Qty 2 | Buy |

TABLE 2-continued

| Price Range in Market 1 | Prices in Market 2 | Quantity | Order Type |
|---|---|---|---|
| Price Range 3 | Price 3 | Qty 3 | Buy |
| Price Range 4 | Price 4 | Qty 4 | Sell |

Referring to Table 2, assume that a trader is interested in "Market 1" and "Market 2." If the price range in "Market 1" is in "Price Range 1," then send a buy order for "1" at a price equal to "Price 1." If the price range in "Market 1" is in "Price Range 2," then send a buy order for "1" at a price equal to "Price 2." If the price range in "Market 1" is in "Price Range 3," then send a buy order for "1" at a price equal to "Price 3." If the price range in "Market 1" is in "Price Range 4," then send a sell order for "1" at a price equal to "Price 4." The ranges and price values may be defined in any manner. For instance, they can be static (e.g., "price 100 through price 125.06") or they can be dynamic (e.g., based on an equation).

B. Inputting a Market Event

According to the present embodiments, the market event may be defined using graphical user interface ("GUI") options provided by the client-side software or an exchange. More specifically, the market event may be typed into a graphical user interface such as a visual (and audio, if so desired) computer environment running on the trading terminal that represents options with graphical images, such as icons, menus, and dialog boxes on the screen. According to the present embodiments, the trader can select and activate these options by pointing and clicking with a mouse, with the keyboard, or through some other input device. Screens may be provided that have locations in which a particular type of data is typed into and later stored or sent to the exchange. For example, "Condition" might contain fields to store the condition that the exchange will detect, and so on. In another example, "Action" might contain fields to store the action to be taken when the associated condition is detected. Individual fields may be characterized by their maximum length and the type of data that can be placed in them.

According to another aspect, the market event may be automatically generated by trading software on the client device. For instance, the trading software may generate or update the market event request or a lookup table and then automatically send the market event to the electronic market.

Alternatively, the visual (and audio, if so desired) computer environment might be provided by the exchange over the communication link. Then, the trader could log onto an active site and input the necessary information to define one or more market events. If desired, the trader could associate the market event with an order or order type.

According to another aspect of the preset embodiments, an electronic exchange or some other party may define one or more market events for a particular market. If the exchange defines a market event, then preferably, the market event is stored at the exchange and can be electronically accessed by the electronic market.

Also, it is envisioned that an electronic exchange can receive a market event from a trader or some other party and automatically generate a lookup table for its own use. Then, for example, a trader could send a market event equation to the electronic exchange and the electronic exchange could use the equation to automatically generate the lookup table.

C. Receiving the Market Event

To transmit the market event information to the exchange, information pertaining to the market event may be included with the first order message. In particular, assume that a trader sends a first order from a client device to an exchange. The first order includes an electronic message that contains, among other things, order parameters such as order price and quantity.

According to the present embodiments, the electronic message may contain flag bits that inform the electronic market that this order has one or more market events attached to it. Further, it might have information that describes which market to watch or what news to monitor. For instance, if a lookup table was used to define the market event, the order might have information that tells the electronic market to go to that particular table.

Alternatively, the electronic message may contain an actual detailed definition of the market event. In other words, each order may have one or more market events defined so that when the electronic exchange's software and/or hardware components process the order, the electronic market may use the definition to take immediate or near immediate action, or alternatively, it may store the definition for future use. If the definition is stored, then when the market event condition is satisfied, the electronic market may be notified in some fashion such as by a software interrupt, which is a program-generated interrupt that stops current processing to request an action provided by market event definition. Other mechanisms may be used to notify the electronic market when the market event condition is satisfied.

In another aspect, the market event information may be included in a separate electronic message from the first order. According to this embodiment, the trader can send the market event definition to the exchange at any time before the actual market event or condition occurs or the first order expires. Once the exchange receives the market event definition, it may use it or store it for later reference.

In yet another alternative embodiment, some other party may define the market event. For example, an organization, exchange, or some other third party may develop a market event for tradable objects traded in a particular market. This market event may be loaded directly or indirectly at each applicable electronic market or at each relevant component (e.g., component 306 described directly below) designed to process orders for a particular market.

The inventions described herein are not limited by the types of market event conditions defined, the manner in which they are defined, the manner in which they are communicated to the exchange or the manner in which the exchange accesses them.

At block 404, the electronic market 302 monitors the state of the market and/or other outside market influences. This may be performed by monitoring component 306. Monitoring the state of the market preferably includes monitoring the portion of the market that pertains to the stated condition given in the market event request. This may also include monitoring other electronic markets, news, and other outside sources that can influence the market. According to the present embodiments, the monitoring component 306 monitors the state of the market for a period of time. In one embodiment, the state of the market is monitored while the trader's order is resting in the market or while the trader is actively trading in the market. In another embodiment, the state of the market is monitored for a period of time based upon some other preferred arrangement.

At block 406, the monitoring component 306 determines if the market event condition is satisfied based on what it monitors. The determination may be performed by the exchange's matching engine or at some other point in the confines of the exchange, or alternatively, at some location within communication of an exchange. As soon as the market event condition is satisfied, the electronic market preferably performs the action associated with the market event.

At block 408, the action-taking component 308 triggers a market event action. For example, if the action were to send a second order, then a second order would be sent to a second market or second exchange. The second order could be an order to buy a tradable object or it could be an order to sell a tradeable object. It is referred to as the "second order" because it is a subsequent order to the first order sent to one or more exchanges on behalf of a trader. The second exchange, if needed, refers to any electronic exchange and, more particularly, refers to the exchange that the second order is sent to. According to the present embodiments, the parameters of the second order may be defined along with the market event.

There are times when an exchange or an electronic market may experience downtime in which actions may not be completed and as a result, orders might be left stranded. To handle such situations, the preferred system could be programmed to delete all orders in the market, or keep all orders where they are in the market (stored in some storage base). Of course, any possible scenario may be programmed for to accommodate particular markets under such exchange or electronic market downtimes.

IV. Example Implementations

Directly below are some example implementations of the present embodiments. They are intended to show how one skilled in the art may use the present embodiments described herein to perform various actions on behalf of the trader. Preferably, these actions taken by an electronic market to lessen the burden often placed on traders using a conventional trading system and yet assist the traders in executing their trading strategies. Of course, the example implementations provided below are not meant to be exhaustive.

Figure 5:
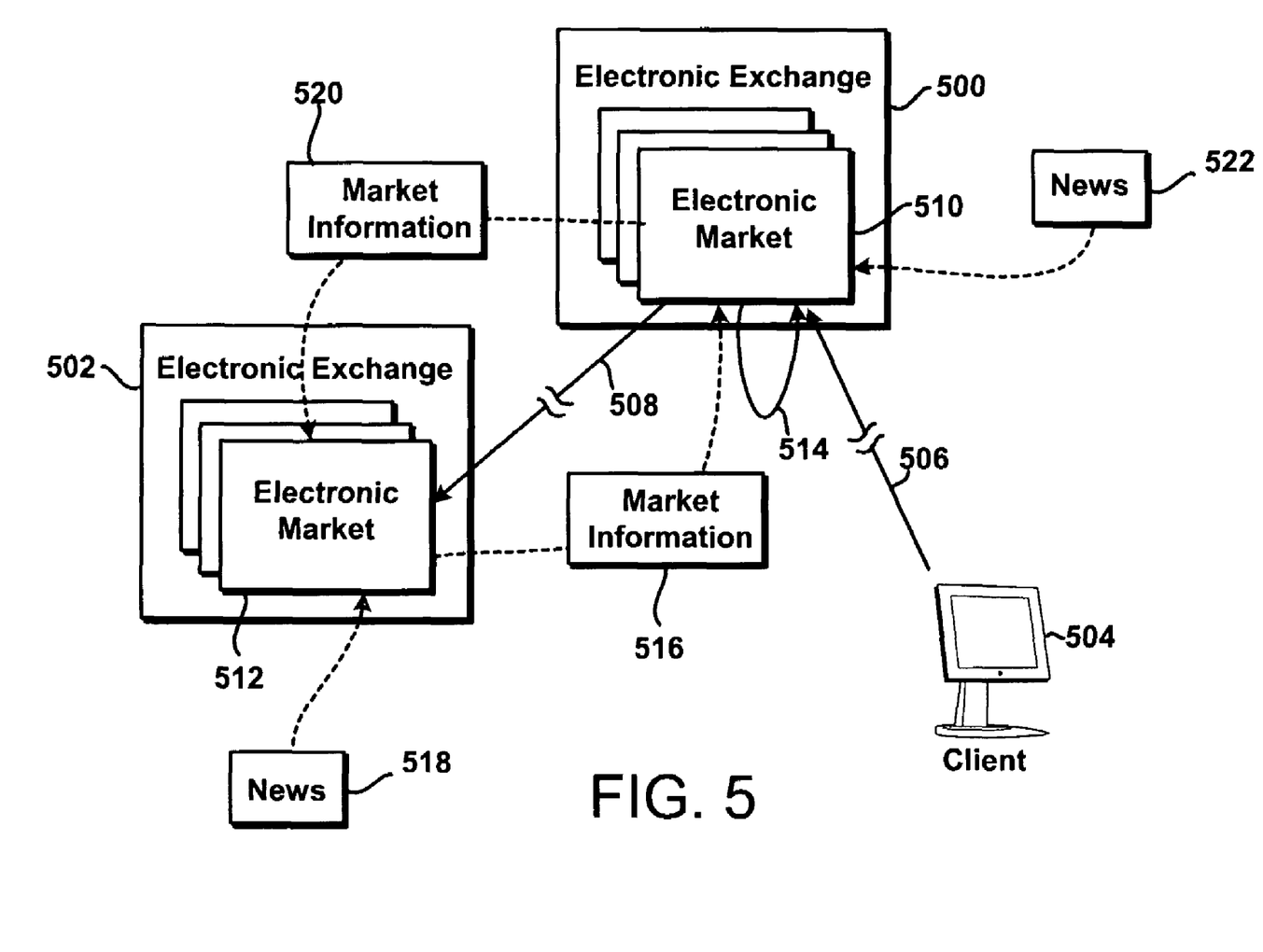
FIG. 5 is a flow diagram that illustrates how an electronic market may use the example process of FIG. 4 to perform an action on behalf of a trader such as sending or managing orders based on internal and/or external market events.

A. One Electronic Market Sending Orders to and/or Managing Orders at Another Electronic Market In one embodiment, an electronic market can send orders to and/or manage orders at another electronic market based on an external or internal market event. In view of that, FIG. 5 is provided to show an overview of the architecture, functionality, and operation of a possible implementation of the present embodiments in hardware, software, firmware, or a combination thereof. In general, FIG. 5 shows two electronic exchanges 500 and 502 such that each electronic exchange 500 and 502 has one or more electronic markets associated with it. Electronic markets 510 and 512 are of interest in this example. It should also be understood that electronic markets 510 and 512 might exist at the same electronic exchange. Moreover, FIG. 5 shows a trader's client device 504 in communication with at least the electronic market 510.

In particular, electronic market 510 can send a buy or sell order to electronic market 512 by path 508 or to another electronic market listed at electronic exchange 500 by path 514 when an external and/or internal market event condition is satisfied. External information shown in the figure may include market information 516 and news 522. Other types of external information might include specific information from client device 504 such as the trader's net position, profit/loss numbers, and so forth. Internal information may include market information 520.

This feature is of particular importance because it allows an electronic market to send and manage orders on behalf of a trader. For example, if a trader is spread trading the two markets, then the order at electronic market 512 might be based on market conditions in electronic market 510 and the order in electronic market 510 might be based on market conditions in electronic market 512. If so, then the electronic market 510 can automatically manage the orders in the other markets such as changing their prices to reflect changes in other markets on which they depend. Of course, this feature is not limited to spread trading, but they may also be used to hedge investment risk according to any type of trading strategy.

In addition, this feature may be used by an electronic market. For instance, this feature may allow a first electronic market to send an order to a second electronic market when the first electronic market does not have enough quantity to fill a particular order. Here is a brief example to illustrate: assume that a first electronic market has an offer to sell "10" at a price of "50" in its order book. Then, a trader sends an order to buy "100" at a price of "50" to a first electronic market. If programmed to do so, the first electronic exchange may fill "10" of the first order and then send a second order to buy "90" at a particular price to a second electronic market on behalf of the trader. The first electronic market may be programmed to automatically search other electronic exchanges for the best prices and quantity.

B. An Electronic Market Managing Orders in its Market

In another embodiment, an electronic market may manage orders in its own market based on an external market event. Referring to FIG. 5, electronic market 510 can view external information such as market information 516 and news 522, and when an external market event condition is satisfied, the electronic market 510 can manage orders that are in electronic market 512 on behalf of the trader.

In particular, a trader can send a buy or sell order to electronic market 510 by path 506. When an external market event occurs, the electronic market 510 preferably modifies the order according to the defined market event. In other words, the electronic market 510 can change the order price, change the order quantity, delete the order, or perform other types of modifications on orders in its order book on behalf of the trader when an external market event condition is satisfied.

Likewise, when an external market event to electronic market 512 occurs, then electronic market 512 preferably modifies the order in its market according to a defined market event. In other words, the electronic market 512 can change the order price, change the order quantity, delete the order, or perform other types of modifications on orders in its order book on behalf of the trader when an external market event condition is satisfied.

This feature may be used in any particular trading strategy. For example, this feature may be used to hedge investment risk. To illustrate, this feature might be used in spread trading such that if two different electronic markets employed this technology, each electronic market can automatically manage its own order according to market conditions found in the other electronic market.

V. Conclusion

In conclusion, a system and method is described herein for an electronic market to act based on a defined market event on behalf of a trader. A trader can define a market event that comprises a condition and an action. The trader can transmit the market event to an electronic market with a first order or it can be transmitted in a separate message. In addition, the market event may be loaded directly or indirectly at the electronic exchange by a third party such as the exchange. Depending on the market event, the exchange may monitor internal and/or external market information to determine if the market event condition is satisfied. When the market event condition is satisfied, the electronic market proceeds by performing the action associated with the condition of the defined market event. The action may include sending one or more orders to one or more markets, adjusting orders in one or more markets, deleting orders in one or more markets, and so forth. The markets can be listed at one exchange or at different exchanges.

There are many advantages for enabling an electronic market to act on behalf of a trader. Those of ordinary skill in the art of trading would recognize the many benefits of such system upon reading the description herein. Nonetheless, for sake of illustration, some advantages and features of the present embodiments are provided directly below. However, it should be understood that the present invention is not limited to the advantages and features described herein.

One advantage of the present embodiments is that electronic markets are open to view market information and other trading related information from other outside sources to act in its market on behalf of a trader. This creates a more unified trading environment that carries with it a multitude of advantages, such as providing an easier way to provide risk management because all of a trader's orders could be known and accounted for in determining things like margin requirements and so forth.

Another advantage of the present embodiments is that a first exchange may send an offsetting order to a second market faster than a trader can using a conventional trading system. For example, when spread trading, a trader might send a first order in one market. Once the first order is filled, the trader generally offsets the position by placing a second order in a second market. Sometimes, the second market is not listed with the same exchange that lists the first market. Moreover, sometimes the second market is listed by the same exchange. By using the present embodiments, the second order can attain a higher priority than by using a conventional trading system, thereby increasing the likelihood of being filled and completing the spread. This may also help in reducing the undesirable effect of being "legged up" in spread trading, which normally occurs when the conditions in the second market change before the offsetting order is filled to complete the spread.

Yet, another advantage of the present embodiments is that a first exchange can change or delete an order in a market when a market event condition is satisfied. The action of changing or deleting may occur faster than if the action was performed by the trader.

A further advantage of the present embodiments is that a high-speed connection may be used between the first and second exchanges to facilitate even faster transport of orders. Traders may take advantage of the fast connection speed between exchanges. Take for example that traders located over a large geographic region and they may be connected to at least two exchanges over various network connections. Using a conventional trading system, the second order may be delayed by the message being sent across large geographic regions (and/or being sent over less than desirable network connections) to the second exchange. The delay only increases when considering the extra time it takes to receive a fill confirmation message from the first exchange before the second order may be sent. However, by using the present embodiments, a first exchange may be directly connected to a second exchange using a high-speed and reliable network connection. Then, the second order may be passed efficiently and quickly from the first exchange to the second exchange. As a result, the present embodiments may reduce potential inequities between traders that are geographically close to the electronic exchange and traders that are geographically far from the electronic exchange.

Another advantage of the present embodiments is that they can offload the client-side software from performing tasks that may be completed more efficiently at the exchange side. For example, using the present embodiments an exchange may send an order to another exchange on behalf of a trader when a market event is detected. In particular, offloading the client-side software results in the software performing fewer steps while actually the trader's order entry speed is significantly enhanced.

A further advantage of the present embodiments is that they can reduce bandwidth consumption between the client devices and the exchanges. The present embodiments allow for a reduction in messaging required to process two or more orders. For example, when a market event is detected by the first exchange, it can send an order to the second exchange without tying up the networks between the second exchange and the client device. Furthermore, other things can be done to reduce network consumption like waiting to send a fill confirmation until both the first order and the second order are both filled.

Yet, another advantage of the present embodiments is that they provide a more competitive trading environment. In particular, an exchange that sends orders to other exchanges based upon certain market events raises the level of competition between the exchanges, which gives the traders a more desirable trading environment.

Another advantage of the present embodiments is that it provides for a more reliable way to send offsetting orders. The reliability makes the trading environment more robust by offsetting orders automatically without requiring network communication between the exchanges and the trader. That way, if the trader's network experiences slow transfer speeds or network downtime, the trader no longer has to worry about offsetting an order that just filled by sending an order from his or her trading terminal.

A further advantage of the present embodiments is that it makes trading at the exchange more desirable because it allows for automatic offsetting of orders by an exchange rather than by the trader. This not only can help increase profitability at the exchange, but it can provide a more liquid trading environment for traders interested in hedging their investments.

It should be emphasized that the above-described embodiments of the present invention, particularly, any "preferred" or "present" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included within the scope of the present invention and protected by the following claims.

Moreover, the claims should not be read as limited to the described order or elements unless stated to that effect. Thus, all variations that come within the scope and spirit of the following claims and equivalents thereto are claimed as the invention.

What is claimed is:

1. A method for sending an order to an electronic market, comprising:

receiving from a trader a first order message having an order to buy or sell a quantity of a first tradeable object at a first price and a market event request, the first order message received at a first electronic exchange having a first computerized matching process configured to match orders for the first tradeable object, the market event request including a condition and an associated predetermined action to be taken on behalf of the trader, the action including sending an order to buy or sell a second tradeable object to a second electronic exchange having a second computerized matching process configured to match orders for the second tradeable object;

detecting the condition at the first electronic exchange;

in response to detecting the condition, sending a second order to buy or sell the second tradeable object on behalf of the trader from the first electronic exchange to the second electronic exchange, wherein the second tradeable object is different from the first tradeable object, wherein tradeable objects matched at the first exchange are different than tradeable objects matched at the second exchange, and the action of sending the order is taken on behalf of the trader by the first electronic exchange using a microprocessor executing one or more instructions.

2. The method of claim 1 wherein sending is performed in response to determining that the condition is satisfied.

3. The method of claim 1, wherein the condition comprises at least a portion of the first order being filled.

4. The method of claim 2 further comprising receiving a market event request message at the first electronic exchange that establishes the condition.

5. The method of claim 2 wherein the condition is in the form of a lookup table.

6. The method of claim 1 further comprising sending a message from the first electronic exchange to the second electronic exchange instructing the second electronic exchange to modify the second order sent on behalf of the trader, wherein the action of sending the message is taken on behalf of the trader by the first electronic market.

7. The method of claim 6 wherein the message to modify the second order sent on behalf of a trader is sent when a second condition has been satisfied.

8. The method of claim 1 wherein the first electronic exchange comprises a matching engine that matches bids and offers for a market according to a first-in-first-out (FIFO) matching algorithm.

9. The method of claim 1 wherein the first electronic exchange comprises software running at a point of access that is outside of the first electronic exchange.

10. The method of claim 1, wherein the trader maintains control over the order and maintains control over the second order at the second electronic exchange, while pending at the second electronic exchange.

11. The method of claim 10, wherein the order comprises an identifier to indicate to the second electronic exchange that the order belongs to the trader.

12. The method of claim 1, wherein sending is performed when the condition is satisfied, and wherein the condition is based on a market event that occurs internal to the first electronic exchange.

13. The method of claim 1, wherein sending is performed when the condition is satisfied, and wherein the condition is based on a market event that occurs external to the first electronic exchange.

14. The method of claim 1, wherein sending is performed when the condition is satisfied, and wherein the condition is based on a news event.

15. The method of claim 1, wherein the first tradeable object and the second tradeable object comprise a spread trading strategy.

16. The method of claim 1, wherein the second order is intended to hedge risk based on a position taken in the first tradeable object.

17. The method of claim 1, wherein sending comprises generating the second order.

18. A non transitory computer readable medium containing program instructions for causing a microprocessor to execute a method for use by a trader in an electronic trading system that includes at least one computer terminal connected over a network to at least one electronic exchange, comprising:

receiving from a trader a first order message having an order to buy or sell a quantity of a first tradeable object at a first price and a market event request, the first order message received at a first electronic exchange having a first computerized matching process configured to match orders for the first tradeable object, the market event request including a condition and an associated predetermined action to be taken on behalf of the trader, the action including sending an order to buy or sell a second tradeable object to a second electronic exchange having a second computerized matching process configured to match orders for the second tradeable object;

detecting the condition at the first electronic exchange;

in response to detecting the condition, sending a second order to buy or sell the second tradeable object on behalf of the trader from the first electronic exchange to the second electronic exchange, wherein the second tradeable object is different from the first tradeable object, wherein tradeable objects matched at the first exchange are different than tradeable objects matched at the second exchange, and the action of sending the order is taken on behalf of the trader by the first electronic exchange using a microprocessor executing one or more instructions.

* * * * *